(12) United States Patent
Sugaya

(10) Patent No.: US 6,632,848 B2
(45) Date of Patent: Oct. 14, 2003

(54) HETEROGENEOUS ANION EXCHANGER

(75) Inventor: Yoshio Sugaya, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/909,904

(22) Filed: Jul. 23, 2001

(65) Prior Publication Data

US 2002/0042451 A1 Apr. 11, 2002

(30) Foreign Application Priority Data

Jul. 24, 2000 (JP) ........................ 2000-221831

(51) Int. Cl.[7] .................................. C08J 5/22

(52) U.S. Cl. ................. 521/27; 521/28; 521/32; 525/233; 525/240

(58) Field of Search ............... 521/27, 32, 28; 525/233, 240

(56) References Cited

U.S. PATENT DOCUMENTS

| | | | | |
|---|---|---|---|---|
| 2,788,330 | A | * | 4/1957 | Gilwood |
| 5,350,523 | A | * | 9/1994 | Tomoi ........................ 210/683 |
| 5,948,826 | A | * | 9/1999 | Terada .......................... 521/27 |
| 6,338,784 | B1 | * | 1/2002 | Terada ........................ 204/632 |

FOREIGN PATENT DOCUMENTS

JP  09132654  *  5/1997

* cited by examiner

*Primary Examiner*—Fred Zitomer
(74) *Attorney, Agent, or Firm*—Oblon, Spivak, McClelland, Maier & Neustadt, P.C.

(57) ABSTRACT

A heterogeneous anion exchanger comprising from 35 to 85 mass % of an anion exchange resin and from 15 to 65 mass % of a binder polymer, wherein the anion exchange resin is made of a polymer having repeating units represented by the following formula (1):

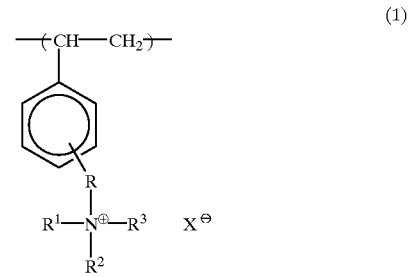

(1)

wherein R is a $C_{3-8}$ alkylene group or an alkyleneoxyalkyl group having a total carbon number of from 4 to 9, $R^1$ is a $C_{1-4}$ alkyl group which may be substituted by a hydroxyl group, each of $R^2$ and $R^3$ is a $C_{1-4}$ alkyl group, and $X^-$ is an anion, and wherein any hydrogen atom bonded to the benzene ring may be substituted by an alkyl group or a halogen atom.

11 Claims, No Drawings

HETEROGENEOUS ANION EXCHANGER

The present invention relates to a heterogeneous anion exchanger.

Anion exchange membranes are reported in many literatures and patents. However, the most practical and useful one may be an anion exchange membrane having anion exchange groups introduced into a styrene/divinylbenzene copolymer having chloromethyl groups on its aromatic rings, or an anion exchange membrane made from a vinylpyridine/divinylbenzene copolymer. In addition to its chemical resistance and thermal resistance, such a membrane has a feature that the ion exchange characteristics or the selective permeability can be controlled by changing the content of the divinylbenzene as a crosslinking agent. Accordingly, various types have been synthesized and developed for various applications. Especially in the field of electrodialytic concentration of sea water for salt production, a membrane has been developed which has a low electric resistance and a high transport number and which has a high level of function to selectively permeate monovalent ions.

However, such an ion exchange membrane made of a styrene/divinylbenzene copolymer requires a cumbersome and sensitive process of polymerization and reaction, which is costly, and it is difficult to control the heat generation or dimensional change which takes place during the process, whereby the yield tends to be poor. Further, it is constituted by a styrene type resin which is relatively brittle, whereby during a high temperature use or depending upon the components in the water to be treated, the membrane is likely to excessively swell, thus leading to a problem of deterioration of the membrane strength or the selective ion permeability.

As a means to solve such problems, a heterogeneous ion exchange membrane prepared by mixing a pulverized ion exchange resin and a binder polymer, followed by heat extrusion or casting by means of a solvent to form a membrane, has been extensively studied since about 1950.

For example, U.S. Pat. No. 3,627,703 and JP-B-47-24262 disclose a case wherein polypropylene is used as a binder polymer; U.S. Pat. No. 4,167,551, JP-B-52-3912, JP-B-53-18472 and JP-B-51-12313 disclose a case wherein a polyolefin such as polyethylene or polypropylene is employed; U.S. Pat. Nos. 2,681,319 and 2,681,320 disclose a case wherein polyethylene, polyisobutylene, natural rubber, butyl rubber, polyisoprene, polychloroprene, a styrene/butadiene rubber, nitrile rubber or vinyl chloride/fatty acid vinyl ester copolymer is employed; and U.S. Pat. No. 5,346,924 and WO94-06850 disclose a case wherein a linear low density polyethylene or a high molecular weight high density polyethylene is used. Further, JP-A-9-132654 discloses use of a. styrene type thermoplastic elastomer, and JP-A-10-36530 discloses a case wherein a mixture comprising a low density polyethylene and an ethylene/propylene rubber or an ethylene/propylene/diene rubber, is employed.

However, heterogeneous ion exchangers employing such binders had a problem of high costs, or a problem that the durability in an alkaline solution, although improved to some extent, was not necessarily sufficient. On the other hand, with respect to anion exchange resins having good durability, many proposals have been made including JP-A-5-15789 which proposes an anion exchange resin having certain specific anion exchange groups. However, no ion exchange membranes made of such anion exchange resins, are known.

It is an object of the present invention to provide a heterogeneous anion exchanger which is inexpensive, as it is a heterogeneous anion exchanger, and which has durability and dimensional stability at the same time and to provide a novel water treating method employing a membrane made of such an ion exchanger.

The present invention provides a heterogeneous anion exchanger comprising from 35 to 85 mass % of an anion exchange resin and from 15 to 65 mass % of a binder polymer, wherein the anion exchange resin. is made of a polymer having repeating units represented by the following formula (1):

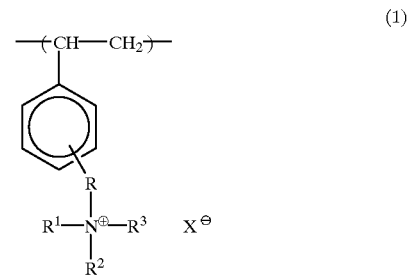

(1)

wherein R is a $C_{3-8}$ alkylene group or an alkyleneoxyalkyl group having a total carbon number of from 4 to 9, $R^1$ is a $C_{1-4}$ alkyl group which may be substituted by a hydroxyl group, each of $R^2$ and $R^3$ is a $C_{1-4}$ alkyl group, and $X^-$ is an anion, and wherein any hydrogen atom bonded to the benzene ring may be substituted by an alkyl group or a halogen atom.

Now, the present invention will be described in detail with reference to the preferred embodiments.

In the repeating units represented by the formula (1), R is a $C_{3-8}$ alkylene group or an alkyrleneoxyalkyl group (an alkylene group containing an oxygen atom of an ether bond) having a total carbon number of from 4 to 9. Specifically, R may, for example, be —$(CH_2)_n$—, wherein n is an integer of from 1 to 6, a tetramethyleneoxymethyl group (—$(CH_2)_4$—O—$CH_2$—, one having the tetramethylene group side bonded to nitrogen) or a pentamethyleneoxymethyl group (—$(CH_2)_5$—O—$CH_2$—, one having the pentamethylene group side bonded to nitrogen).

$R^1$ is a $C_{1-4}$ alkyl group which may be substituted by a hydroxyl group, and each of $R^2$ and $R^3$ is a $C_{1-4}$ alkyl group. They may be the same or different from one another. Such an alkyl group may, for example, be a methyl group, an ethyl group, a propyl group or a butyl group. Particularly preferred is a case where $R^1$ is a methyl group or a hydroxyethyl group, and each of $R^2$ and $R^3$ is a methyl group.

$X^-$ is a monovalent anion which is a counter ion coordinated with the cation exchange group which is the quaternary ammonium group. Specifically, it may, for example, be a halogen ion such as $Cl^-$, $Br^-$ or $I^-$, $NO_3^-$, $OH^-$ or a p-toluene sulfonic ion. Otherwise, $X^1$ may be a polyvalent anion such as $SO_4^{2-}$. In such a case, a polyvalent anion is coordinated so that the electrical equivalence balances between the polyvalent anion and the cation of the ion exchange group, and $X^-$ represents a polyvalent anion corresponding to monovalent.

Any hydrogen atom on the benzene ring in the formula (1) may be substituted by an alkyl group or a halogen atom. As the substituent on the benzene ring, an alkyl group such as an ethyl group, or a halogen atom such as a chlorine atom or a bromine atom, may be mentioned.

The anion exchange resin having repeating units represented by the formula (1), may contain, in addition to the repeating units represented by the formula (1), other repeating units to control ion selectivity or mechanical strength. As such other repeating units, repeating units derived from a crosslinkable monomer made of a hydrocarbon compound having an unsaturated bond, are preferred. The crosslinkable monomer is not particularly limited, and it may, for example, be divinylbenzene, trivinylbenzene, divinyltoluene, divinylnaphthalene or ethylene glycol dimethacrylate. Further, the anion exchange resin may contain, as repeating units which do not contribute to crosslinking or ion exchange, repeating units derived from a monomer such as styrene, vinyltoluene or acrylonitrile.

The ion exchange groups may include ion exchange groups other than those contained in the repeating units represented by the formula (1). In such a case, in order to maintain the heat resistance or durability, it is preferred that at least 90 mol % of the total ion exchange group capacity is the ion exchange capacity of the ion exchange groups contained in the repeating units represented by the formula (1). The monomer from which repeating units other than the repeating units represented by the formula (1) are derived, may, for example, be vinylpyridine or chloromethylstyrene.

The ion exchange capacity of the ion exchange resin in the present invention is preferably from 1.0 to 5.0 meq/g dry resin. If the ion exchange capacity is smaller than this, the electrical resistance of the heterogeneous anion exchanger thereby obtainable, tends, to be high, and if it is larger than this, the mechanical strength of the heterogeneous anion exchanger tends to be low, such being undesirable.

The particle size of the anion exchange resin in the present invention is preferably such that the maximum particle size is 150 µm. Further, it is preferred that particles having particle sizes of from 100 to 150 µm are at most 5 mass % of the total, and those having particle sizes of at most 20 µm are at most 20 mass %. If the maximum particle size exceeds 150 µm, or if those having a particle sizes from 100 to 150 µm exceed 5 mass %, pin holes are likely to form in the heterogeneous anion exchange membrane thereby obtainable, and mechanical strength of the membrane tends to be low, such being undesirable.

Further, if particles having particle sizes of at most 20 µm exceeds 20 mass %, the surface area of the ion exchange resin particles increases more than necessary, and kneading with the binder polymer tends to be inadequate, whereby defects are likely to result, such being undesirable. An attempt to prevent such defects by sufficient heating or by prolonging the operational time required for the kneading, is not desirable, since it is likely to lead to decomposition of ion exchange groups due to the temperature rise, or it tends to lead to an increase of the electrical resistance of the membrane, such being undesirable.

The maximum particle size of the anion exchange resin is particularly preferably at most 75 µm. If the maximum particle size is at most 75 µm, the increase in the viscosity of the heterogeneous anion exchanger during the melt molding can be suppressed, whereby deterioration of the moldability can be avoided, and formation of defects on the surface of the heterogeneous ion exchanger thereby obtainable, can be controlled. if the maximum particle size is adjusted to be at most 45 µm, this effect will be further improved, such being more preferred.

The heterogeneous anion exchanger of the present invention is prepared by mixing the above anion exchange resin and the binder polymer. With respect to the blend ratio of the anion exchange resin and the binder polymer, it is necessary that the content of the anion exchange resin is from 35 to 85 mass %, based on the total amount of the anion exchange resin and the binder polymer. If the anion exchange resin is less than 35 mass %, the electrical resistance of the heterogeneous anion exchanger thereby obtainable tends to be high. If the anion exchange resin exceeds 85 mass %, the mechanical strength of the heterogeneous anion exchanger thereby obtainable, is likely to be low. More preferably, the content of the anion exchange resin is from 40 to 70 mass %.

The content of the binder polymer is required to be from 15 to 65 mass %, based on the total amount of the anion exchange resin and the binder polymer. If the content of the binder polymer is less than 15 mass %, the strength of the heterogeneous anion exchanger thereby obtainable, tends to be inadequate, and if it exceeds 65 mass %, no adequate ion exchange performance of the ion exchange resin tends to be obtained.

The binder polymer is preferably a thermoplastic resin having an unsaturated bond ratio in its main chain of at most 3%. The unsaturated bond ratio in its main chain is one having the number of double bonds and triple bonds among the number of carbon atoms constituting the main chain represented by percentage. For example, with a polybutadiene polymer, the unsaturated bond ratio is 25.0%, and with the 1:1 of styrene/butadiene, the unsaturated bond ratio is 16.7%. If the unsaturated bond ratio in the main chain of the binder polymer exceeds 3%, the long term durability of the heterogeneous anion exchanger tends to be lost, and particularly, the heat resistance or chemical resistance when used at a high temperature, tends to be impaired, such being undesirable. Particularly preferably, the unsaturated bond ratio in the main chain is at most 1%.

The binder polymer preferably has a shore A hardness of from 70 to 97 mm (as measured by ASTM D2240, ISO 48). If the shore A hardness exceeds 97 mm, the membrane tends to be brittle, such being undesirable. If the shore A hardness is smaller than 70 mm, the membrane tends to be soft, and the deformation by a pressure tends to be substantial, such being undesirable. A particularly preferred range of the shore A hardness is from 86 to 95 mm.

The binder polymer preferably has a tensile break strength of at least 13 MPa (as measured by ASTM D412, ISO 37). If the tensile break strength is smaller than 13 MPa, the strength of the obtainable membrane tends to be low.

The binder polymer preferably has an elongation at break of from 500 to 900% (as measured by ASTM D412, ISO 37). If the elongation at break is less than 500%, the membrane is likely to break, and if it exceeds 900%, the film thereby obtainable tends to be soft more than necessary. A particularly preferred range of the elongation at break is from 750 to 850%.

The binder polymer preferably has a Vicat softening point of from 75 to 150° C., as measured by ISO 306. particularly preferably, the Vicat softening point is from 90 to 130° C. If the Vicat softening point is lower than 75° C., the membrane is likely to undergo heat deformation during the use of the membrane. On the other hand, if the Vicat softening point is higher than 150° C., the temperature required for the preparation of the membrane tends to be high, whereby the ion exchange groups in the anion exchange resin are likely to be decomposed. A particularly preferred range of the Vicat softening point is from 90 to 130° C.

By totalizing the above conditions, in the present invention, the binder polymer preferably has an unsaturated bond ratio in its main chain of at most 3%, a shore A hardness of from 70 to 97 mm, a tensile break strength of at least 13 MPa, an elongation at break of from 500 to 900% and a Vicat softening point of from 75 to 150° C.

The thermoplastic resin having an unsaturated bond ratio in its main chain of at most 3% to be used as the binder polymer of the present invention, is preferably a resin so-called a thermoplastic elastomer or a thermoplastic plastomer. Particularly preferred is a styrene type thermoplastic elastomer. The styrene type thermoplastic elastomer is a copolymer having hard segments made of polystyrene and soft segments. The soft segments are preferably made of polybutadiene, polyisoprene, an ethylene/butylene alternating copolymer or an ethylene/propylene copolymer.

Specifically, the styrene type thermoplastic elastomer may, for example, be a polystyrene/hydrogenated polybutadiene/polystyrene block polymer (H-SBS), a polystyrene/polyethylene/butylene rubber/polystyrene block polymer (SEBS), a polystyrene/hydrogenated polyisoprene rubber/polystyrene block polymer (H-SIS), a polystyrene/(polyethylene/propylene rubber) /polystyrene block polymer (SEPS), a polystyrene/(polyethylene/ polyethylene/propylene rubber)/polystyrene block polymer (SEEPS) or a polystyrene/(vinylpolyisoprene (polyisopropenylethylene))/polystyrene block polymer. A hydrogenated styrene/butadiene rubber or a hydrogenated nitrile rubber, or a mixture thereof may also be preferably employed.

When a binder polymer having an unsaturated bond ratio of at most 3% in its main chain can, not be obtained by a single polymer, a plurality of polymers may be mixed and used as the binder polymer of the present invention. When a mixture of a plurality of polymers is to be used as a binder polymer, it is preferred to employ a mixture of a low density polyethylene with a rubber made of an ethylene/propylene copolymer, or a mixture of a low density polyethylene with a rubber made of an ethylene/propylene/butadiene copolymer, as the above-mentioned binder polymer.

When such a binder polymer is employed, the density of the low density polyethylene is preferably from 0.880 to 0.930 g/cm$^3$, particularly preferably from 0.990 to 0.926 g/cm$^3$. Further, the melt flow rate is preferably from 3.0 to 30 g/10 min as measured by the method of JIS-K6760. As the low density polyethylene to be used in this mixture system, a linear low density polyethylene may be employed.

The rubber made of an ethylene/propylene copolymer is preferably one containing from 25 to 50 mass % of the repeating units based on propylene and having a Mooney viscosity of from 35 to 50. Further, the rubber made of an ethylene/propylene/butadiene copolymer preferably contains from 25 to 50 mass % of repeating units based on propylene, and has a Mooney viscosity of from 40 to 90.

In the mixture of a low density polyethylene with a rubber made of an ethylene/propylene copolymer or a rubber made of an ethylene/propylene/butadiene copolymer, the content of the rubber made of an ethylene/propylene copolymer or the rubber made of an ethylene/propylene/butadiene copolymer, is preferably from 10 to 50 mass %, based on the total weight of the mixture. If the content of such a rubber is less than 10 mass %, the membrane tends to be brittle. If it exceeds 50 mass %, the membrane tends to be soft more than necessary. The content of the rubber is particularly preferably from 25 to 30 mass %, whereby the moldability can be improved while maintaining the above described characteristics.

Further, as a preferred embodiment constituting the binder polymer, a mixture of a low density polyethylene with a styrene type thermoplastic elastomer, or a mixture of a low density polyethylene with hydrogenated SBR, may be mentioned. At that time, a high density polyethylene, polypropylene or polyisobutylene may be incorporated as a third component.

The heterogeneous anion exchanger of the present invention is preferably produced in such a manner that an anion exchange resin is dried, pulverized and classified and then kneaded with a binder polymer, followed by extrusion molding or hot melt molding such as heat press molding. Especially when a heterogeneous anion exchange membrane is to be produced, it is preferred to employ hot melt molding. The heterogeneous anion exchanger may be molded into a preferred form such as a flat membrane-form, a hollow fiber form, a cylindrical-form, a mesh form, a porous form, a filament form, a particle form, a non-woven fabric form, a woven fabric form or a net form.

A solution treating apparatus having an electrodialytic mechanism or a diffusion dialytic mechanism employing the heterogeneous anion exchange membrane of the present invention as a diaphragm, is excellent in heat resistance and can be operated under a stabilized condition for a long period of time even under a condition such that the temperature of the water to be treated is at least 40° C. Further, with a solution treating apparatus having an electrodialytic mechanism, the electric power consumption rate can be reduced, as the electrical resistance of the membrane is small. Further, with a solution treating apparatus having a diffusion dialytic mechanism, the amount of water to be treated can be increased as the ion permeation rate of the membrane can be increased.

Further, the solution treating apparatus of the present invention can be used for treatment of an aqueous solution for the purpose of sterilization and cleaning. At that time, the entire solution treating apparatus is preferably maintained at a temperature of at least 60° C. If the temperature is lower than 60° C., it takes time for sterilization and cleaning, and the effects may not be sufficient. As a method of maintaining the entire solution treating apparatus at a temperature of at least 60° C., a method of adjusting the temperature of the water to be treated at a level of at least 60° C., or a method of maintaining the temperature of the entire apparatus at a level of at least 60° C. after termination of the supply of water, may be mentioned.

The anion exchanger of the present invention formed into a membrane, can be used as a diaphragm for electrodialysis for concentration of sea water, demineralization of brine water, concentration and recovery of an acid or recovery of valuable metals, for diffusion dialysis for e.g. recovery of an acid, or for a solution treatment such as electrolysis. Further, it can be used as a diaphragm of a separator for e.g. a secondary battery or a fuel cell. Further, the anion exchange membrane of the present invention is excellent in chemical resistance, and it can be preferably used for other than an aqueous solution, for example, for an organic solvent having an electrolyte dissolved therein or for a liquid mixture of an organic solvent with water. Further, it is useful for a water treating apparatus for concentrating, demineralizing and purifying hydroxide from a solution having a pH of 10 or higher by electrodialysis or diffusion dialysis.

Now, the present invention will be described in further detail with reference to Examples and Comparative Examples. However, it should be understood that the present invention is by no means restricted by such specific Examples.

EXAMPLE 1

A strongly basic anion exchange resin (Diaion SSA10, tradename, manufactured by Mitsubishi Chemical Corporation, ion exchange capacity: 3.4 meq/g dry resin) having repeating units represented by the formula (1) wherein R is a tetramethylene group, and each of $R^1$, $R^2$ and $R^3$ is a methyl group, and $X^-$ is $Cl^-$, and repeating units based on divinylbenzene, was used. Such a strongly basic anion exchange resin was dried by warm air at 60° C. for 24 hours and then pulverized in a rotor mill. The pulverized particles were sieved by a stainless steel mesh to remove particles having particle sizes of 45 μm or more.

60 Parts by mass of the obtained anion exchange resin powder particles and 40 parts by mass of a binder polymer were mixed and kneaded by a laboplastomill at a temperature of 200° C. for 10 minutes. As the binder polymer, a polystyrene type thermoplastic elastomer (Septon 2007, tradename, manufactured by Kuraray Co., Ltd.) having polystyrene as hard segments, and an ethylene/propylene copolymer as soft segments, was used.

This binder polymer had an unsaturated bond ratio in its main chain of 0%, a shore A hardness of 80 mm, a tensile break strength of 23.5 MPa, an elongation at break of 700% and a Vicat softening point of 100° C. The obtained kneaded product was subjected to hot melt pressing at 200° C. by a flat plate press and formed into a membrane having a thickness of 500 μm. The formed membrane was immersed in deionized water at 50° C. for two days.

This membrane had an ion exchange capacity of 2.0 meq/g dry resin and a resistivity of 400 Ω·cm as measured in a 0.5 mol/l sodium chloride aqueous solution at an alternating current of 1,000 Hz. The static transport number was 0.95, as measured at 25° C. with (0.5 mol/Q sodium chloride aqueous solution)/membrane/(1.0 mol/Q sodium chloride aqueous solution). The tensile strength was 2.6 MPa, the elongation at break was 160%, and the bursting strength was 0.15 MPa. The above anion exchange membrane was converted to an OH ion-form by a 0.1 mol/l sodium hydroxide aqueous solution, whereupon it was immersed in deionized water at 80° C. for 6 months. The characteristics of the membrane after the immersion are shown in Table 1.

EXAMPLE 2

70Parts by mass of a low density polyethylene and 30 parts by mass of an ethylene/propylene/butadiene rubber were mixed and kneaded in a laboplastomill at 150° C. for 30 minutes to obtain a mixture. The physical properties of the mixture were such that the unsaturated bond ratio in its main chain was 0.4%, the shore A hardness was 95 mm, the tensile break strength was 16.7 MPa, the elongation at break was 780%, and the Vicat softening point was 105° C.

An anion exchange membrane was prepared in the same manner as in Example 1 except that this polymer was used as the binder polymer. The obtained membrane was immersed in deionized water at 50° C. for two days, whereupon it was measured in the same manner as in Example 1, whereby the ion exchange capacity was 2.0 meq/g dry resin, the electric resistivity was 300 Ω·cm, and the static transport number was 0.95. The tensile strength was 2.5 MPa, the elongation at break was 150%, and the bursting strength was 0.13 MPa. The above anion exchange membrane was converted to an OH ion-form in the same manner as in Example 1, and immersed in deionized water at 80° C. for 6 months in the same manner as in Example 1, whereupon the membrane was measured, and the results are shown in Table 1.

EXAMPLE 3

An anion exchange membrane having a thickness of 500 μm was prepared in the same manner as in Example 1 except that a low density polyethylene was used as the binder polymer, the anion exchange resin was 50 parts by mass, and the binder polymer was 50 parts by mass. The obtained membrane was immersed in deionized water at 50° C. for two days, whereupon it was measured in the same manner as in Example 1, whereby the ion exchange capacity was 1.7 meq/g dry resin, the electric resistivity of the membrane was 900 Ω·cm, and the static transport number was 0.90. The tensile strength was 2.1 MPa, the elongation at break was 180%, and the bursting strength was 0.2 MPa. The above anion exchange membrane was converted to an OH ion-form in the same manner as in Example 1, and immersed in deionized water at 80° C. for 6 months in the same manner as in Example 1, whereupon the membrane was measured, and the results are shown in Table 1.

Comparative Example 1

An anion exchange membrane having a thickness of 500 μm was prepared in the same manner as in Example 2 except that a strongly basic anion exchange resin (Diaion SA-10A, manufactured by Mitsubishi Chemical Corporation, ion exchange capacity: 3.6 meq/g dry resin) having repeating units represented by the formula (1) wherein R is a methylene group, each of $R^1$, $R^2$ and $R^3$ is a methyl group, $X^-$ is $Cl^-$, and repeating units based on divinylbenzene, was employed.

The obtained membrane was immersed in deionized water at 50° C. for two days and then measured in the same manner as in Example 1, whereby the ion exchange capacity was 2.0 meq/g dry resin, the electric resistivity of the membrane was 300 Ω·cm, and the static transport number was 0.94. Further, the tensile strength of this membrane was 2.5 MPa, the elongation at break was 150%, and the bursting strength was 0.13 MPa. The above anion exchange membrane was converted to an OH ion-form in the same manner as in Example 1, and immersed in deionized water at 80° C. for 6 months in the same manner as in Example 1, whereupon the membrane was measured, and the results are shown in Table 1.

TABLE 1

| | Ion exchange capacity (meq/g dry resin) | Resistivity of membrane (Ω · cm) | Static transport number |
|---|---|---|---|
| Ex. 1 | 1.96 | 420 | 0.94 |
| Ex. 2 | 1.96 | 360 | 0.94 |
| Ex. 3 | 1.63 | 950 | 0.90 |
| Comp. Ex. 1 | 1.50 | 1,000 | 0.88 |

Evaluation results

As anion exchange membranes, the anion exchange membranes prepared in Example 2 and Comparative Example 1 were used. Employing each anion exchange membrane and a cation exchange membrane (CMT, tradename, manufactured by Asahi Glass Company, Limited), an electrodialyser (DW-0 model electrodialyser, manufactured by Asahi Glass Company, Limited, effective membrane area: 2.1 dm², 11 air cell) was assembled.

To a demineralizing compartment of this electrodialyser, a 0.1 mol/l sodium hydroxide aqueous solution of 60° C. was supplied at a rate of 0.3 m²/hr, and a current of 2 A/dm² was conducted to carry out concentration of sodium hydroxide.

When the anion exchange membrane obtained in Example 2 was used, the concentration of the aqueous sodium hydroxide solution obtained at the initial stage of the operation was 3 mol/l, and the current efficiency was 85%. These values did not change even after 30 days. On the other hand, when the anion exchange membrane obtained in Comparative Example 1 was used, the concentration of the aqueous sodium hydroxide solution obtained at the initial stage of operation was 3 mol/l, and the current efficiency was 85%, but after 30 days, the concentration of the aqueous sodium hydroxide solution was 2.5 mol/l, and the current efficiency was 80%. Thus, the performance deteriorated.

The heterogeneous anion exchanger of the present invention has good heat resistance and resistance to bases, and when it is used for an apparatus for producing deionized water by e.g. electrodialysis, deterioration in the deionizing performance such as an increase of the electrical conductivity, will not be observed even after the operation for a long period of time, whereby administration of the operation of the apparatus can be done at a low cost. As it is a heterogeneous membrane, it is inexpensive and has an improved mechanical strength, whereby it is durable for use for a long period of time.

The entire disclosure of Japanese Patent Application No. 2000-221831 filed on Jul. 24, 2000 including specification, claims and summary are incorporated herein by reference in its entirety.

What is claimed is:

1. A heterogeneous anion exchanger comprising from 35 to 85 mass % of an anion exchange resin and from 15 to 65 mass % of a binder polymer, wherein the anion exchange resin is made of a polymer having repeating units represented by the following formula (1):

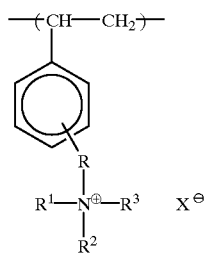

(1)

wherein R is a $C_{3-8}$ alkylene group or an alkyleneoxyalkyl group having a total carbon number of from 4 to 9, $R^1$ is a $C_{1-4}$ alkyl group which may be substituted by a hydroxyl group, each of $R^2$ and $R^3$ is a $C_{1-4}$ alkyl group, and X is an anion, and wherein any hydrogen atom bonded to the benzene ring may be substituted by an alkyl group or a halogen atom, wherein the binder polymer is a thermoplastic resin having an unsaturated bond ratio in its main chain of at most 3%.

2. The heterogeneous anion exchanger according to claim 1, wherein the binder polymer is a styrene type thermoplastic elastomer.

3. The heterogeneous anion exchanger according to claim 1, wherein the binder polymer is a mixture comprising a low density polyethylene and a rubber made of an ethylene/propylene copolymer, or a mixture comprising a low density polyethylene and a rubber made of an ethylene/propylene/butadiene copolymer.

4. The heterogeneous anion exchanger according to claim 1, wherein the binder polymer has a Shore A hardness of from 70 to 97 mm, a tensile break strength of at least 13 MPa, an elongation at break of from 500 to 900% and a Vicat softening point of from 75 to 150°C.

5. The heterogeneous anion exchanger according to claim 1, which is in the form of a membrane.

6. The heterogeneous anion exchanger according to claim 1, which is in the form of a membrane.

7. The heterogeneous anion exchanger according to claim 2, which is in the form of a membrane.

8. The heterogeneous anion exchanger according to claim 5, which has an ion exchange capacity of from 1.0 to 4.0 meq/g dry resin.

9. The heterogeneous anion exchanger according to claim 5, which has an alternating-current resistivity of from 60 to 6,000 Ω• cm at 25° C. in a 0.5 mol/l sodium chloride aqueous solution.

10. The heterogeneous anion exchanger according to claim 1, wherein the binder polymer has an unsaturated bond ratio of at most 1%.

11. A heterogeneous anion exchanger according to claim 1, wherein the binder polymer has an unsaturated bond ratio of 0%.

* * * * *